(12) United States Patent
Kerszulis et al.

(10) Patent No.: US 10,294,416 B2
(45) Date of Patent: May 21, 2019

(54) YELLOW TO TRANSMISSIVE ELECTROCHROMIC POLYMERS

(71) Applicant: Georgia Tech Research Corporation, Atlanta, GA (US)

(72) Inventors: Justin Adam Kerszulis, Foster City, CA (US); John Robert Reynolds, Dunwoody, GA (US); Aubrey Lynn Dyer, Hapeville, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days.

(21) Appl. No.: 15/309,993

(22) PCT Filed: May 28, 2015

(86) PCT No.: PCT/US2015/032932
§ 371 (c)(1),
(2) Date: Nov. 9, 2016

(87) PCT Pub. No.: WO2015/184115
PCT Pub. Date: Dec. 3, 2015

(65) Prior Publication Data
US 2017/0267920 A1    Sep. 21, 2017

Related U.S. Application Data

(60) Provisional application No. 62/004,108, filed on May 28, 2014.

(51) Int. Cl.
| C09K 9/02 | (2006.01) |
| G02F 1/15 | (2006.01) |
| C08G 61/12 | (2006.01) |

(52) U.S. Cl.
CPC .............. *C09K 9/02* (2013.01); *C08G 61/126* (2013.01); *C08G 2261/124* (2013.01);
(Continued)

(58) Field of Classification Search
CPC .. C09K 9/12; C08G 61/126; C08G 2261/411; C08G 2261/124; C08G 2261/1458;
(Continued)

(56) References Cited

U.S. PATENT DOCUMENTS

| 8,399,603 B2 | 3/2013 | Amb et al. |
| 2011/0233532 A1 | 9/2011 | Sotzing et al. |
| 2013/0235323 A1* | 9/2013 | Sotzing .................... C09K 9/02 351/44 |

FOREIGN PATENT DOCUMENTS

| IN | 2840 MU 2010 A | 2/2014 |
| KR | 2010 0130909 | 12/2010 |

(Continued)

OTHER PUBLICATIONS

Do, Y.R., "Display device with color change layer and fluorescent layer," *Chemical Abstracts Service*, Columbus, OH, Database CA [Online] Dec. 20, 2012, XP002776930, retrieved from STN, Database accession No. 2010:1582099 (abstract).

(Continued)

*Primary Examiner* — Shane Fang
(74) *Attorney, Agent, or Firm* — Alston & Bird LLP

(57) ABSTRACT

Yellow electrochromic polymers (ECPs) are prepared that display a yellow neutral state and a highly transmissive oxidized state. The ECPs are copolymers where a dyad of dioxyhetereocyclic repeating unis alternate with a monad of an aromatic repeating unit. An alternate yellow ECP has an oxidation potential of 450 mV or less and is an alternating copolymer of an acyclic dioxythiophene (AcDOT) or a propylene dioxythiophene (ProDOT) with an aromatic repeating unit that has an electron donating substituent. The yellow ECPs can be processed from solution for electrochromic devices.

7 Claims, 8 Drawing Sheets

(52) U.S. Cl.
CPC ............... *C08G 2261/1412* (2013.01); *C08G 2261/1424* (2013.01); *C08G 2261/312* (2013.01); *C08G 2261/314* (2013.01); *C08G 2261/3142* (2013.01); *C08G 2261/3223* (2013.01); *C08G 2261/3241* (2013.01); *C08G 2261/3243* (2013.01); *C08G 2261/364* (2013.01); *C08G 2261/411* (2013.01); *C08G 2261/54* (2013.01); *C08G 2261/64* (2013.01); *C09K 2211/145* (2013.01); *C09K 2211/1416* (2013.01); *C09K 2211/1458* (2013.01); *C09K 2211/1466* (2013.01); *G02F 2001/1515* (2013.01)

(58) Field of Classification Search
CPC ...... C08G 2261/145; C08G 2261/1466; C08G 2261/1416; C08G 2261/54; C08G 2261/3243; C08G 2261/312; C08G 2261/3142; C08G 2261/3241; C08G 2261/1424; C08G 2261/1412
See application file for complete search history.

(56) References Cited

FOREIGN PATENT DOCUMENTS

| | | |
|---|---|---|
| WO | WO 2003/046106 | 6/2003 |
| WO | WO 2015/179789 | 11/2015 |

OTHER PUBLICATIONS

Bhuvana, T., et al., "Electroactive subwavelength gratings (ESWGs) from conjugated polymers for color and intensity modulation," Nanoscale, 4, 3679-3686 (2012).

Bhuvana, T., et al., "Reversible Full-Color Generation with Patterned Yellow Electrochromic Polymers," Angewandte Chemie International Edition, 52(4):1180-1184 (2013).

Cao, K. et al., Tuning Color, Contrast, and Redox Stability in High Gap Cathodically Coloring Electrochromic Polymers, Macromolecules, 2016, 49 (22), pp. 8498-8507.

Extended European Search Report for corresponding European Application No. 15800364.0 dated May 7, 2018, 17 pages.

Galand, E.M., et al., "Spray Processable Hybrid 3,4-Propylenedioxythiophene: Phenylene Electrochromic Polymers," Macromolecules, 39:7286-7294 (2006).

Icli-Ozkut, M., et al., "A neutral state yellow to navy polymer electrochrome with pyrene scaffold," Organic Electronics 12(9):1505-1511 (2011).

Kerszulis, J.A., et al., "Follow the yellow brick road: Structural Optimization of Vibrant Yellow-to-Transmissive Electrochromic Conjugated Polymers," Macromolecules, 47(16):5462-5469 (2014).

Osterholm, A. et al., Four Shades of Brown: Tuning of Electrochromic Polymer Blends Toward High-Contrast Eyewear, ACS Appl. Mater. Interfaces, 2015, 7 (3), pp. 1413-1421.

Padilla, J. et al., "High contrast solid-state electrochromic devices from substituted 3,4-propylenedioxythiophenes using the dual conjugated polymer approach," Synthetic Metals, 157:261-268 (2007).

PCT International Search Report and Written Opinion of the International Searching Authority for application PCT/US2015/0352932 dated Jul. 29, 2015, 10 pages.

Wang, Y., et al., "Tuning the properties of alternating copolymers from perfluorobenzene and thiophene derivatives," Polymer Preprints, 48(2):127 (2007).

Yin, Y. et al., Design Strategy for Efficient Solution-Processable Red Electrochromic Polymers Based on Unconventional 3,6-Bis(dodecyloxy)thieno[3,2-b]thiophene Building Blocks, Macromolecules, 2018, 51 (19), pp. 7853-7862.

Zhao, H. et al., *A Naphthalene-Based Multi-Electrochromic Material and Its Neutral Green Electrochromic Device*, Int. J. Elecrochem. Sci., vol. 7 (2012) 10685-10697.

* cited by examiner

YELLOW TO TRANSMISSIVE ELECTROCHROMIC POLYMERS

CROSS-REFERENCE TO RELATED APPLICATIONS

This application is the U.S. national stage application of International patent application No. PCT/US2015/032932, filed May 28, 2015, which claims the benefit of U.S. Provisional Application Ser. No. 62/004,108, filed May 28, 2014, the disclosures of which are hereby incorporated by reference in their entireties, including all figures, tables and drawings.

BACKGROUND OF INVENTION

The electrochromism of inorganic, organic small molecule, and polymeric based materials has demonstrated the possibility of wide and lucrative applications ranging from displays, smart windows, E-paper, and E-cloth, to dual use emissive/nonemissive systems. Of the materials listed, conjugated polymers hold significant promise as recent advances have demonstrated that they have straightforward synthesis and color tuning, coupled with potentially low cost processability. The solubility of electrochromic polymers (ECPs) allows for high throughput methods such as spray casting and slot-die coating for large area roll-to-roll processing from aqueous or organic solutions for both display and window applications, necessary for large scale printing and patterning of EC devices.

Cathodically coloring polymers have been formed that possess vibrantly colored neutral and transmissive oxidized states. Polymers that switch from a colored state to a fully transmissive state are required for applications in window and display technologies where multicolor polymers are not appropriate or desired. The electrochromic polymer, ECP-Yellow, herein referred to as ProDOT-Ph, as well as other alternating copolymers disclosed in Amb et al. U.S. Pat. No. 8,399,603, allowed the completion of a full color palette of solution processable ECPs and demonstrated the importance of obtaining a vibrant yellow-to-transmissive electrochrome as this completes both subtractive primary color sets: cyan-magenta-yellow (CMY) and red-yellow-blue (RYB). Through the use of subtractive color mixing, a wide variety of colors can be obtained for use in full color displays. These yellow ECPs are unique in that they are solution-processable cathodically-coloring, yellow-to-transmissive ECPs that switch at oxidation potentials that are relatively high compared to many other electron-rich ECPs.

These relatively high potentials complicate use with multiple ECPs on the same electrode as over-oxidation of more easily oxidized polymers can occur when applying the potential to switch ProDOT-Ph to a fully transparent state. Hence, the identification of conjugated polymers with lower oxidation potentials to achieve high transparency in the bleached state, while maintaining a vibrant yellow neutral state is desirable.

BRIEF SUMMARY

Embodiments of the invention are directed to yellow electrochromic polymers (ECPs) that are a copolymer having a dyad of a dioxy heterocyclic repeating units alternating with an aromatic repeating unit of the structure:

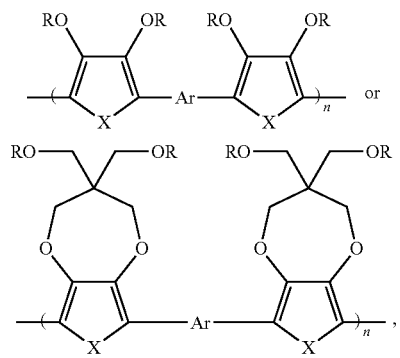

where Ar is an aromatic repeating unit, thiophene repeating unit, furan repeating unit, pyrrole repeating unit, selenophene repeating unit, or any combination thereof; n is 2 to 200,000; X is S, Se, O, or NR; R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_9$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl $C_1$-$C_4$ trialkyammonium salt.

The aromatic repeating units can have the structure:

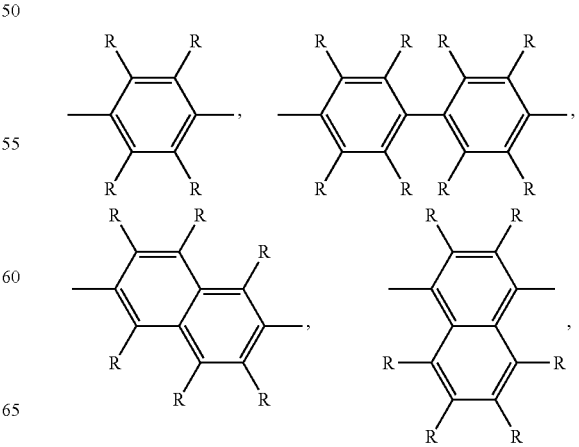

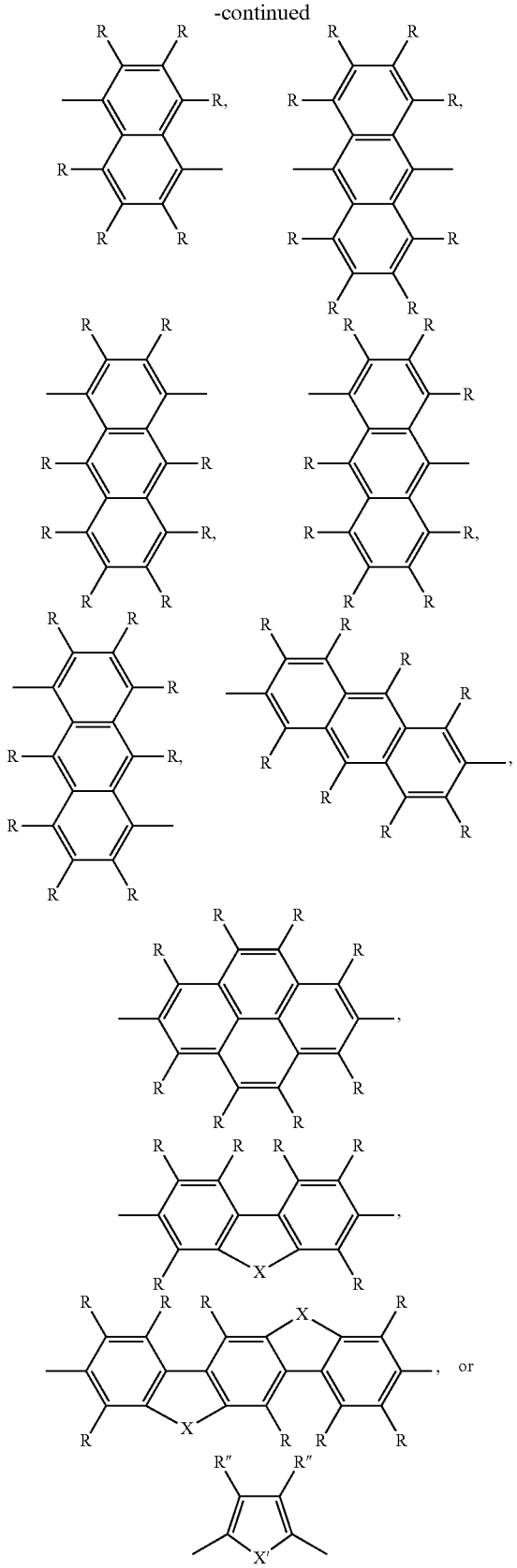

where: X is NR', PR', S, O, Se, SO$_x$, CR$_2$, SiR'$_2$, GeR'$_2$, or BR', where x=1 or 2; X' is NR', O, Se, or S; where R' is H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$alkylsulfonic acid, C$_3$-C$_{30}$alkylsulfonate salt, C$_1$-C$_{30}$ alkylcarboxylate salt, C$_1$-C$_{30}$ alkylthiocarboxylate salt, C$_1$-C$_{30}$ alkyldithiocarboxylate salt or C$_3$-C$_{30}$ alkyl C$_1$-C$_4$ trialkyammonium salt; R" is independently H, C$_1$-C$_{30}$ alkyl, C$_3$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl; and R is independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, hydroxy, C$_1$-C$_{30}$ alkoxy, C$_6$-C$_{14}$ aryloxy, C$_7$-C$_{30}$ arylalkyloxy, C$_2$-C$_{30}$ alkenyloxy, C$_2$-C$_{30}$ alkynyloxy, C$_8$-C$_{30}$ arylalkenyloxy, C$_8$-C$_{30}$ arylalkynyloxy, CO$_2$H, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_1$-C$_{30}$ alkylamino, C$_6$-C$_{14}$ arylamino, C$_7$-C$_{30}$ (arylalkyl)amino, C$_2$-C$_{30}$ alkenylamino, C$_2$-C$_{30}$ alkynylamino, C$_8$-C$_{30}$ (arylalkenyl)amino, C$_9$-C$_{30}$ (arylalkynyl)amino, C$_2$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl)amino, C$_{15}$-C$_{30}$ aryl(arylalkyl)amino, C$_8$-C$_{30}$ alkenyl(aryl)amino, C$_8$-C$_{30}$ alkynyl(aryl)amino C(O)NH$_2$ (amido), C$_2$-C$_{30}$ alkylamido, C$_7$-C$_{14}$ arylamido, C$_8$-C$_{30}$ (arylalkyl)amido, C$_2$-C$_{30}$ dialkylamido, C$_{12}$-C$_{28}$ diarylamido, C$_8$-C$_{30}$ aryl(alkyl)amido, C$_{15}$-C$_{30}$ di(arylalkyl)amido, C$_9$-C$_{30}$ alkyl(arylalkyl)amido, C$_{16}$-C$_{30}$ aryl(arylalkyl)amido, thiol, C$_1$-C$_{30}$ hydroxyalkyl, C$_6$-C$_{14}$ hydroxyaryl, C$_7$-C$_{30}$ hydroxyarylalkyl, C$_3$-C$_{30}$ hydroxyalkenyl, C$_3$-C$_{30}$ hydroxyalkynyl, C$_8$-C$_{30}$ hydroxyarylalkenyl, C$_8$-C$_{30}$ hydroxyarylalkynyl, C$_3$-C$_{30}$ polyether, C$_3$-C$_{30}$ polyetherester, C$_3$-C$_{30}$ polyester, C$_3$-C$_{30}$ polyamino, C$_3$-C$_{30}$ polyaminoamido, C$_3$-C$_{30}$ polyaminoether, C$_3$-C$_{30}$ polyaminoester, C$_3$-C$_{30}$ polyamidoester, C$_3$-C$_{30}$ alkylsulfonic acid, C$_3$-C$_{30}$alkylsulfonate salt, C$_1$-C$_{30}$ carboxylate salt, C$_1$-C$_{30}$ thiocarboxylate salt, C$_1$-C$_{30}$ dithiocarboxylate salt, or C$_3$-C$_{30}$ alkylC$_1$-C$_4$ trialkyammonium salt.

In an embodiment of the invention, the yellow electrochromic polymer (ECP) is a copolymer of the structure:

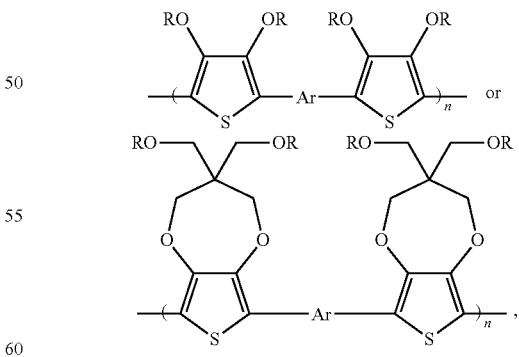

where the dyads are of acyclic dioxythiophenes (AcDOTs) or propylene dioxythiophenes (ProDOTs). The AcDOTs or ProDOTs can be substituted with a group that imposes solubility in at least one solvent.

In another embodiment of the invention, a yellow electrochromic polymer (ECP) is an alternating copolymer of ProDOT and/or ACDOT with one or more aromatic repeating unit that has an electron donating substituent, wherein the ECP has an oxidation potential of 450 mV or less. Exemplary alternating copolymers of this structure include ProDOT-Cbz, ProDOT-Ph(MeO)$_2$, or R-ProDOT-Ph/Ph (MeO)$_2$ where the monad aromatic repeating units are statistically placed phenylene and dimethoxyphenylene repeating units.

In another embodiment of the invention, the yellow electrochromic polymer (ECP), is an alternating copolymer with ProDOT and/or ACDOT repeating unit alternating with pyrene repeating units.

BRIEF DESCRIPTION OF DRAWINGS

FIG. 4 shows normalized neutral state spectra of cast copolymer films on ITO coated glass in 0.2 M LiBTI/PC electrolyte solution where

DETAILED DISCLOSURE

Figure 1:
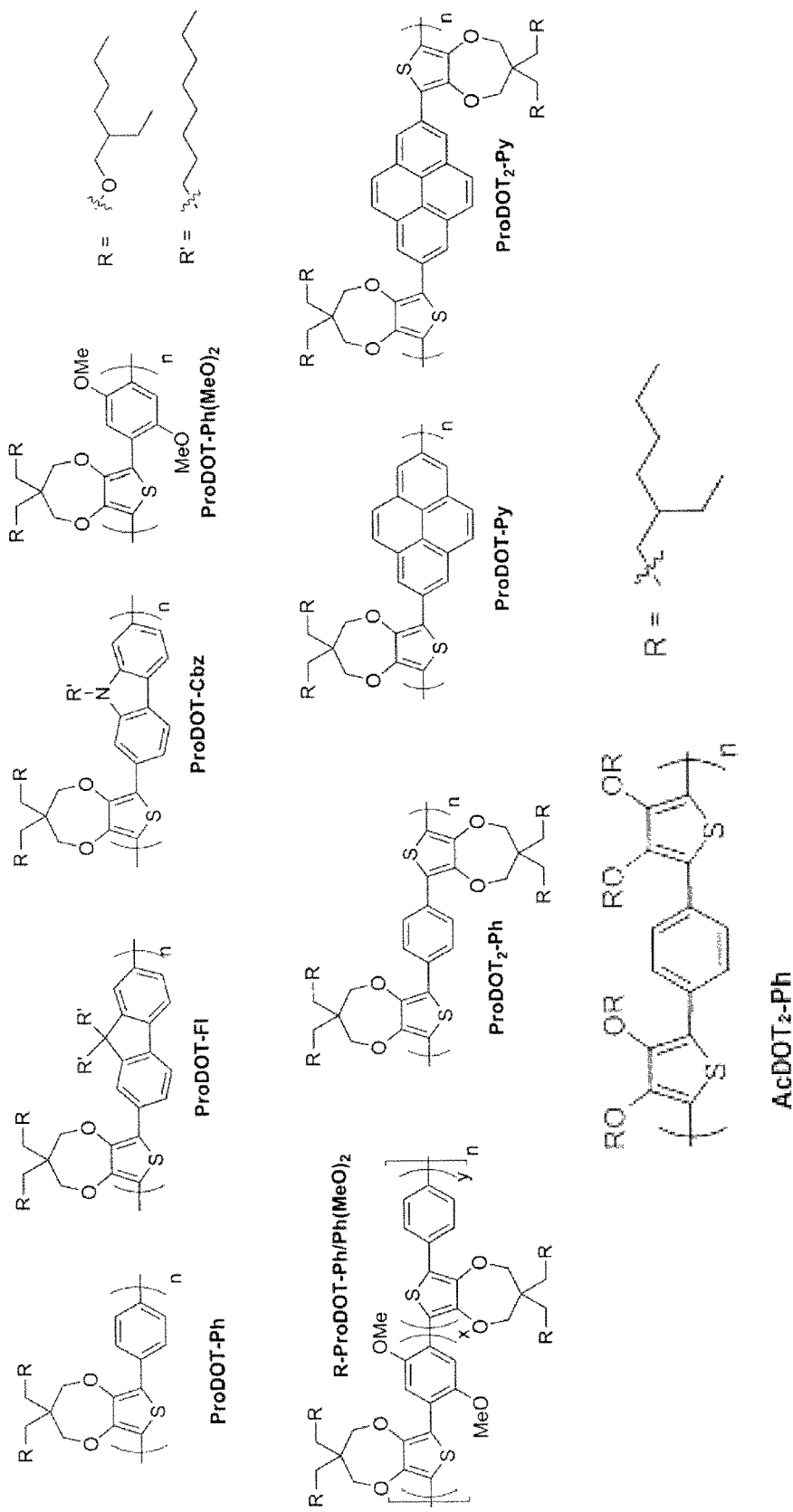
FIG. 1 shows the structure of yellow electrochromic copolymers for prior art and copolymers according to an embodiment of the invention.

Embodiments of the invention are directed to electrochromic polymers ECPs that have one or more arylene unit in alternation with propylene dioxythiophenes (ProDOTs) repeating units, dimers of ProDOT (ProDOT$_2$), or acyclic dioxythiophenes (AcDOT). In an embodiment of the invention, the copolymer's oxidation potential is below 400 mV vs Ag/Ag$^+$ and are yellow, or near yellow, in their neutral states with nearly colorless transmissive oxidized states. In an embodiment of the invention, the copolymer is an alternating copolymer of a dimer of the donor ProDOT or ACDOT with an aromatic unit to form a copolymer characterized by a donor dyad, ProDOT$_2$ or ACDOT$_2$ alternating with an aromatic unit. The aromatic unit can be a single aromatic repeating unit or a plurality of different aromatic repeating units, wherein the individual repeating units are separated by a ProDOT$_2$ or ACDOT$_2$ unit. A single copolymer can include ProDOT$_2$ or ACDOT$_2$ units where all dyads are separated by single aromatic units. In an embodiment of the invention, the donor ProDOT or ACDOT forms an alternating copolymer with pyrene. In an embodiment of the invention, the yellow ECP is an alternating copolymer of a ProDOT or ACDOT with aromatics having an electron donating nitrogen or oxygen group. These copolymers can be used in applications that include: electrochromic windows that are absorptive transmissive devices including structural windows, automotive windows, aircraft windows, sunroofs, skylights, goggles, windshields, aircraft canopies, and glasses; non emissive subtractive displays that include E-paper, E-cloth, smart cards, signage, and billboards; dual emissive/subtractive displays; security applications where a transmissive or reflective background is used and where the yellow copolymer can be used alone or in combination with other electrochromic or photoluminscent polymers/materials for applications that include active banknotes, smartcards, and secure documents; and other applications that include active paint, decorative art, and signaling. These copolymers have the capacity to be used for chemical and biological sensor applications, biological tagging/imaging, and biocompatible implantations.

In an embodiment of the invention, the copolymer has the structure:

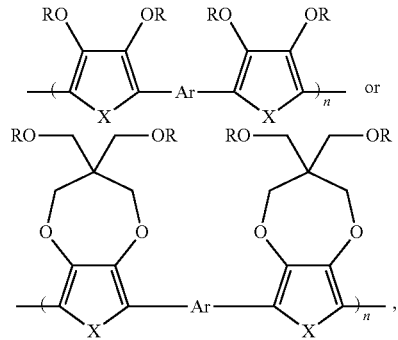

where Ar is an aromatic unit, thiophene unit, furan unit, pyrrole unit, selenophene unit, or any combination thereof; n is 2 to 200,000; X is S, Se, O, or NR; R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino C(O)NH$_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ arylalkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl $C_1$-$C_4$ trialkyammonium salt. In embodiments of the invention the copolymers comprise dyads of an acyclic dioxythiophene and/or a propylene dioxythiophene of the structures:

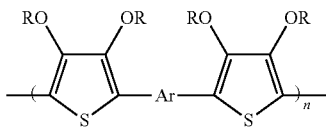

with acyclic dioxythiophenes (AcDOTs) or

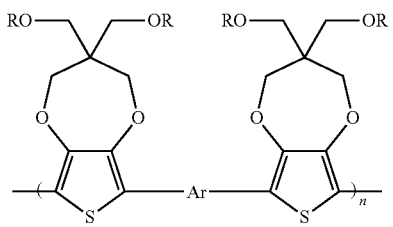

with propylene dioxythiophenes (ProDOTs).
The Ar repeating units can be of the structure:

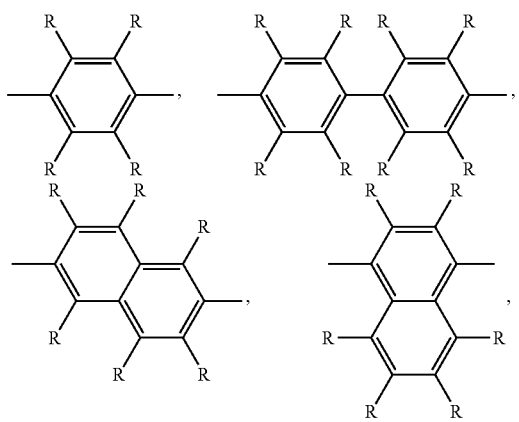

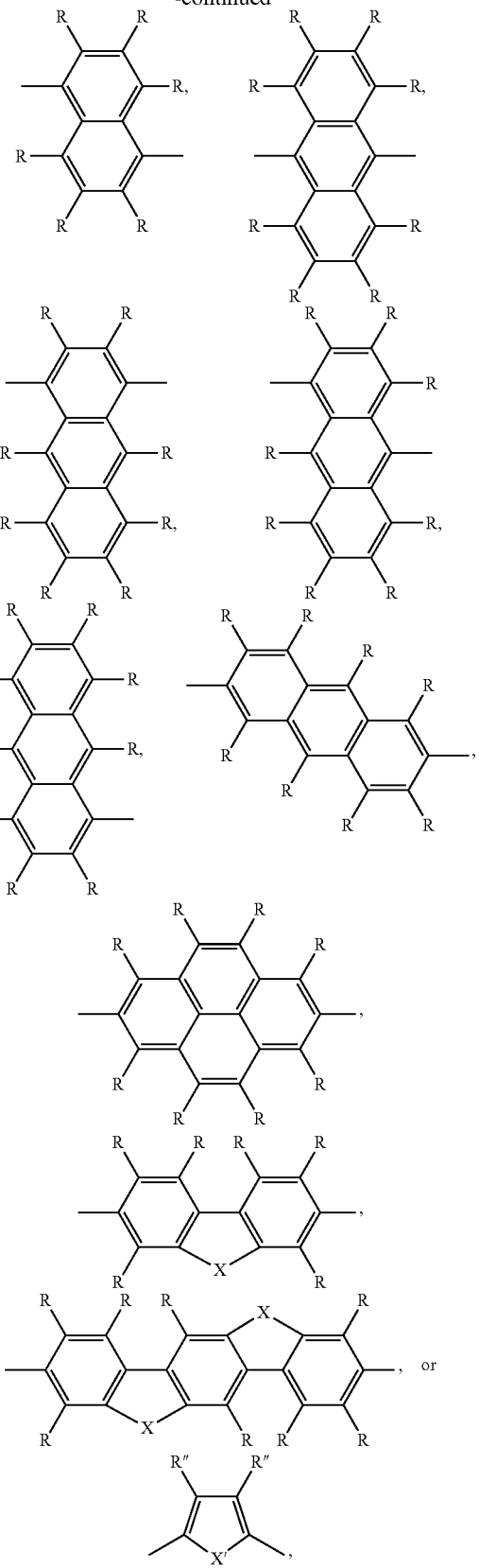

or any combination thereof, where: X is NR', PR', S, O, Se, SO$_x$, CR$_2$, SiR'$_2$, GeR'$_2$, or BR', where x=1 or 2; X' is NR', O, Se, or S; where R' is H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$alkylsulfonic acid, $C_3$-$C_{30}$alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_1$-$C_4$ trialkyammonium salt; R" is independently H, $C_1$-$C_{30}$ alkyl, $C_3$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkynyloxy, $C_8$-$C_{30}$ arylalkenyloxy, $C_8$-$C_{30}$ arylalkynyloxy, $CO_2H$, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, $NH_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, $C_7$-$C_{30}$ di(arylalkyl)amino, $C_8$-$C_{30}$ alkyl(arylalkyl)amino, $C_{15}$-$C_{30}$ aryl(arylalkyl)amino, $C_8$-$C_{30}$ alkenyl(aryl)amino, $C_8$-$C_{30}$ alkynyl(aryl)amino $C(O)NH_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkynyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl$C_1$-$C_4$ trialkyammonium salt.

Figure 2:
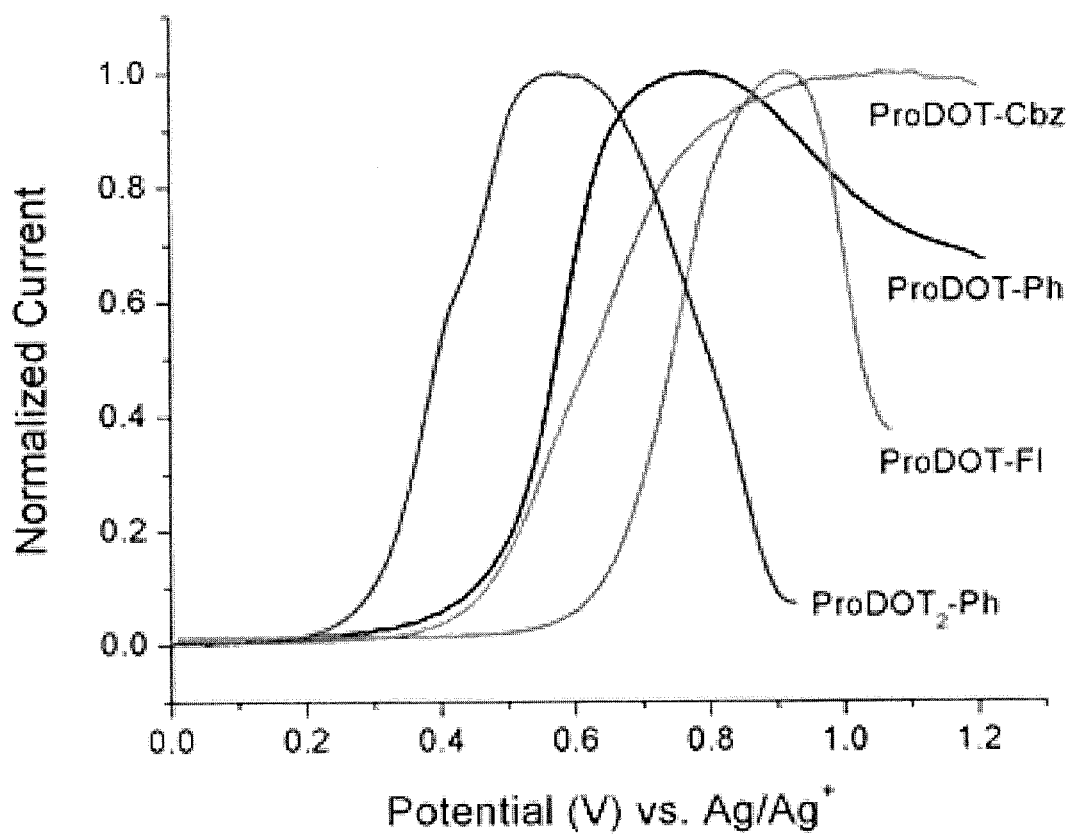
FIG. 2 shows plots of $E_{ox}$ acquired via DPV for copolymers ProDOT-Ph, ProDOT-Fl, ProDOT-Cbz, and ProDOT$_2$-Ph, according to an embodiment of the invention, where current has been normalized and potentials are referenced to 74 mV vs. Fc/Fc$^+$.

FIG. 1 shows exemplary prior art copolymers in addition to exemplary copolymers according to embodiments of the invention with ProDOT repeating units therein. These copolymers can be prepared from Suzuki, Stille-Migata, direct arylation, electrochemical, or oxidative polymerization methods. Yields for Suzuki condensation polymerization and molecular weights, by gel-permeation chromatography (GPC) vs. polystyrene standards are given in Table 1, below. All of the copolymers are soluble in tetrahydrofuran (THF) except ProDOT-Cbz, ProDOT-Py, and ProDOT$_2$-Py which dissolve in hot 1,3,5-trichlorobenzene (TCB). To compare the effect of solvent on molecular weights by GPC, ProDOT-Ph measurements from both solvents are provided in Table 1. All of the copolymers have sufficiently high molecular weights to yield conjugation lengths to give the desired saturated spectra and colors and form continuous electrode supported films via spray-coating. All of these ProDOT copolymers have band gaps ($E_g$) of 2.2 to 2.6 eV and absorption maxima ($\lambda_{max}$) and colorimetric profiles that are indicative of a yellow or near yellow neutral state. The oxidation potentials ($E_{ox}$) of the exemplary copolymers of Amb et al. U.S. Pat. No. 8,399,603 are in excess of 450 mV while those from electron-rich aromatics and ProDOT$_2$, according to embodiments of the invention, display values of 450 mV or less, as is provided in Table 2, below. Due to slow relaxation effects in these neutral conjugated copolymers, presumably due to intercalation of solvent and ions, films were "broken in" prior to performing DPV by repeated cyclic voltammetry (CV) cycling of 4-6 scans from 0 V to a potential where each copolymer film attains its most stable transmissive state. FIG. 2 shows $E_{ox}$ acquired via DPV for ProDOT-Ph, ProDOT-Fl, ProDOT-Cbz, and ProDOT$_2$-Ph films on ITO referenced to 74 mV vs. Fc/Fc$^+$.

TABLE 1

GPC Determined Molecular Weights and Polycondensation Yields

| Polymer | Yield | $M_n$ (kDa) | $M_w$ (kDa) | PDI | Solvent |
|---|---|---|---|---|---|
| ProDOT-Fl | 80% | 12.0 | 17.6 | 1.47 | THF |
| ProDOT-Cbz | 95% | 15.6 | 45.3 | 3.00 | Hot TCB |
| ProDOT-Ph(MeO)$_2$ | 38% | 16.6 | 24.4 | 1.46 | THF |
| R-ProDOT-Ph/Ph(MeO)$_2$ | 20% | 14.9 | 22.4 | 1.50 | THF |
| ProDOT$_2$-Ph | 96% | 13.8 | 26.3 | 1.90 | THF |
| ProDOT-Py | 80% | 8.3 | 25.0 | 3.00 | Hot TCB |
| ProDOT$_2$-Py | 78% | 9.2 | 39.1 | 4.30 | Hot TCB |
| ProDOT-Ph | 85% | 20.2 | 34.4 | 1.70 | THF |
|  |  | 10.8 | 39.1 | 2.90 | Hot TCB |

TABLE 2

Optical and electrochemical properties of the ECPs studied.

| Polymer | $E_{ox}$ (mV vs. Ag/Ag$^+$)$^a$ | $\lambda_{max}$ (nm)$^b$ | $E_g$ (eV)$^c$ | $\lambda_{max}$ (nm)$^c$ | Neutral State L*, a*, b* color coordinates$^c$ |
|---|---|---|---|---|---|
| ProDOT-Ph | 500 | 449 | 2.42 | 445 | 97.4, −8.91, 72.8 |
| ProDOT-Fl | 650 | 436 | 2.51 | 435 | 98.3, −11.6, 58.3 |
| ProDOT-Cbz | 450 | 447* 466 | 2.48 | 445 472 | 97.0, −10.1, 76.1 |
| ProDOT-Ph(MeO)$_2$ | 270 | 423 | 2.25 | 480 | 85.7, 24.8, 60.0 |
| R-ProDOT-Ph/Ph(MeO)$_2$ | 320 | 439 | 2.26 | 462 | 84.0, 14.5, 59.6 |
| ProDOT$_2$-Ph | 300 | 506 | 2.23 | 488 | 85.6, 31.1, 43.1 |
| ProDOT-Py | 460 | 418* 349 | 2.59 | 419 350 | 92.0, −9.97, 47.6 |
| ProDOT$_2$-Py | 320 | 476* 447 350 | 2.42 | 480 448 352 | 90.5, −3.43, 70.8 |

$^a$As determined by DPV as the onset of the current for oxidation.
$^b$For copolymer solutions in chlorobenzene.
$^c$For a film cast onto ITO coated glass.
*Value taken to establish trend.

The trend of oxidation potential onsets (from highest to lowest) for these copolymers are: ProDOT-Fl (650 mV)>ProDOT-Ph (500 mV)>ProDOT-Py (460 mV)>ProDOT-Cbz (450 mV)>ProDOT$_2$-Py=R-ProDOT-Ph/Ph(MeO)$_2$ (320 mV)>ProDOT$_2$-Ph (300 mV)>ProDOT-Ph(MeO)$_2$ (270 mV). Relative to the reference ProDOT-Ph, ProDOT-Fl has the highest $E_{ox}$, a 150 mV. This higher value is attributed to the bridged biphenyl nature of the fluorene, where the additional phenylene ring decreases the highest occupied molecular orbital (HOMO) level. ProDOT-Ph has the second highest $E_{ox}$ due to the high aromaticity of the phenylene unit, imparting a low lying HOMO. The $E_{ox}$ for ProDOT-Py, according to an embodiment of the invention, is 40 mV less than ProDOT-Ph. The carbazole repeating unit of ProDOT-Cbz, according to an embodiment of the invention, further decreases oxidation potentials due to the electron-donating ability of the nitrogen atom bridging the two phenylene rings, raising the HOMO. The alternating copolymer with randomly placed aromatic units, R-ProDOT-Ph/

Ph(MeO)$_2$, according to an embodiment of the invention, has a lower potential because of the incorporation of electron rich dimethoxyphenylene into some of the repeat units, raising the HOMO relative to ProDOT-Ph. For ProDOT$_2$-Py. According to an embodiment of the invention, the incorporation of an additional electron rich ProDOT in an alternating repeat unit with pyrene raised the HOMO relative to ProDOT-Py. The E$_{ox}$ of ProDOT$_2$-Ph is the second lowest in the trend by similar reasoning with ProDOT$_2$-Py. The lowest E$_{ox}$ of the series is for ProDOT-Ph(MeO)$_2$, according to an embodiment of the invention, and is achieved by adding a more electron rich arylene unit in alternation with a single ProDOT. All of the copolymers switch up to 50 cycles with little loss in electroactivity with the exception of ProDOT-Py.

Figure 3A:
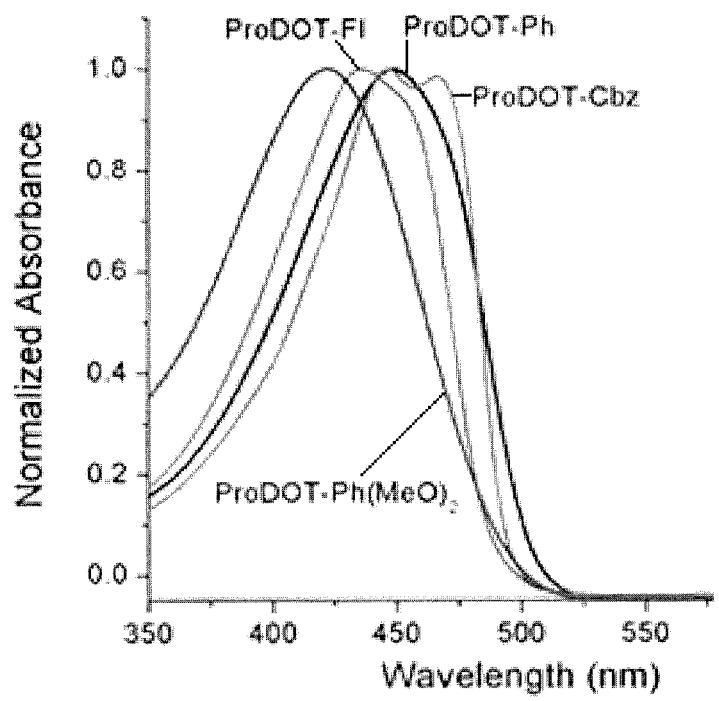
FIG. 3 shows normalized UV-Vis-NIR spectra of copolymer solutions in chlorobenzene with concentrations of solutes for spectra range from 0.05 mg/mL to 0.02 mg/mL where FIG. 3A are ProDOT-Ph, ProDOT-Fi, ProDOT-Cbz, and ProDOT-Ph(MeO)$_2$, and FIG. 3B are R-ProDOT-Ph/Ph (MeO)$_2$, ProDOT-Py, ProDOT$_2$-Py, and ProDOT$_2$-Ph.
Figure 3B:
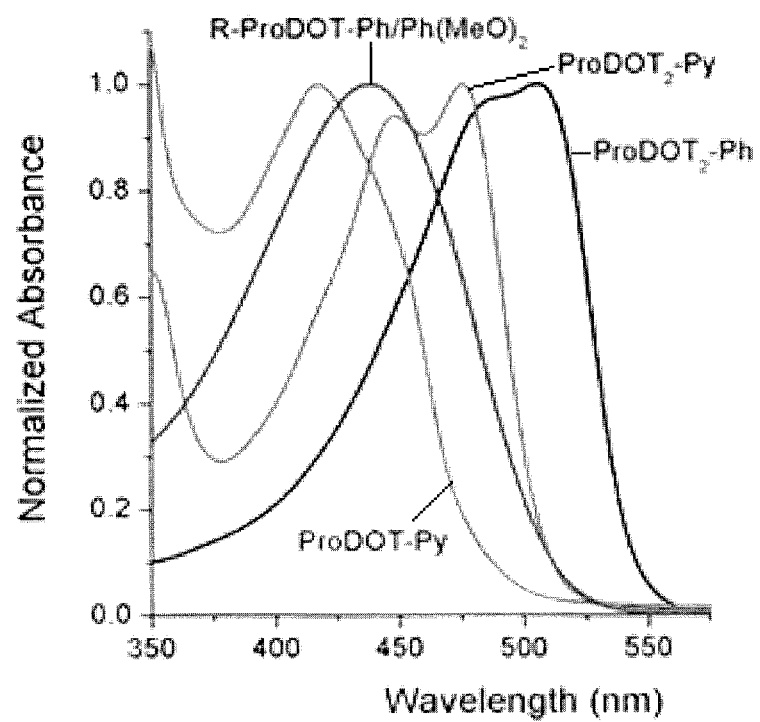

Normalized UV/Vis spectroscopy of copolymer solutions are shown in FIG. 3 with inset photographs of the solutions in vials under white light. The λ$_{max}$ for these copolymers in solution progresses from: ProDOT-Py (417 nm)<ProDOT-Ph(MeO)$_2$ (422 nm)<ProDOT-Fl (436 nm)<R-ProDOT-Ph/Ph(MeO)$_2$ (438 nm)<ProDOT-Cbz (446 nm)<ProDOT-Ph (448 nm)<ProDOT$_2$-Py (475 nm)<ProDOT$_2$-Ph (506 nm). ProDOT-Py has the shortest λ$_{max}$. ProDOT-Ph(MeO)$_2$ has the second shortest λ$_{max}$, which can be ascribed to the bulky methoxy units in place of the smaller hydrogen atom on the phenylene ring and/or to an increase is LUMO from the more electron rich arylene. ProDOT-Fl has the next red-shifted λ$_{max}$. R-ProDOT-Ph/Ph(MeO)$_2$ has a longer λ$_{max}$ attributed to backbone relaxation from randomly dispersed phenylene units that possess no bulky substituents. ProDOT-CBz possesses a λ$_{max}$ that is longer than ProDOT-Fl, consistent with electron donation from the nitrogen atom bridging the biphenyl, raising the HOMO. The third longest λ$_{max}$ is for ProDOT-Ph, due to subtle ortho C—H interactions from a single phenylene in alternation with ProDOT. The second longest λ$_{max}$ for ProDOT$_2$-Py is believed to be due to the additional ProDOT ring in the repeat allowing S—O interactions between neighboring ProDOTs, facilitating planarity and increasing conjugation along the backbone, and/or increased electron rich ProDOT unit content raising the HOMO of the copolymer. The longest λ$_{max}$ is exhibited by ProDOT$_2$-Ph, again because of increased conjugation and ProDOT content.

All solutions are vibrant shades of yellow except for ProDOT$_2$-Ph, which is nearly orange in color. From FIG. 3, ProDOT$_2$-Ph has a solution spectral profile similar in shape and width to ProDOT-Cbz and ProDOT-Ph, but red-shifted by ~60 nm. The peaks at ~350 nm are typically observed for pyrene related materials.

Figure 4A:
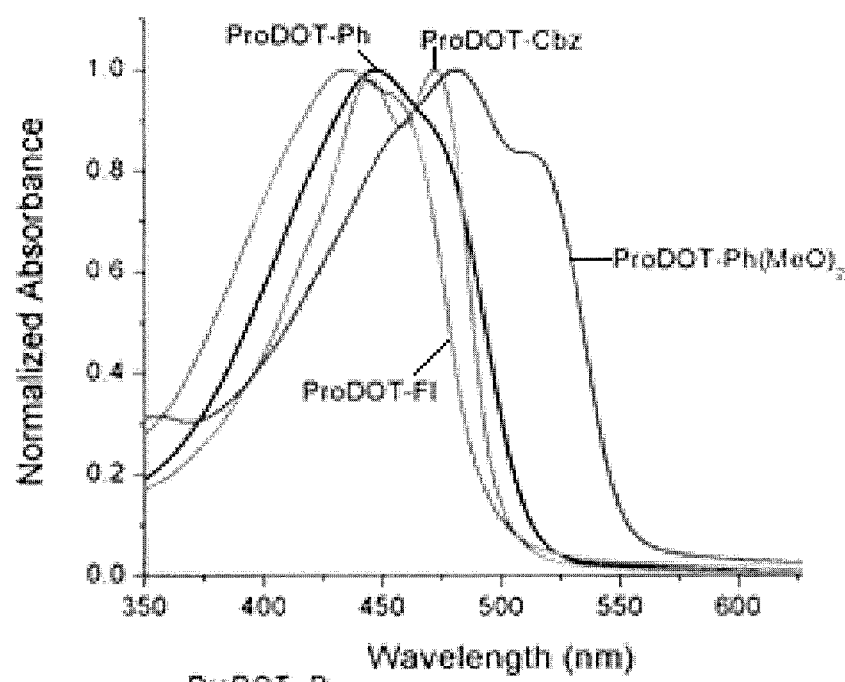
FIG. 4A shows ProDOT-Ph, ProDOT-Fl, ProDOT-Cbz, and ProDOT-Ph(MeO)$_2$
Figure 4B:
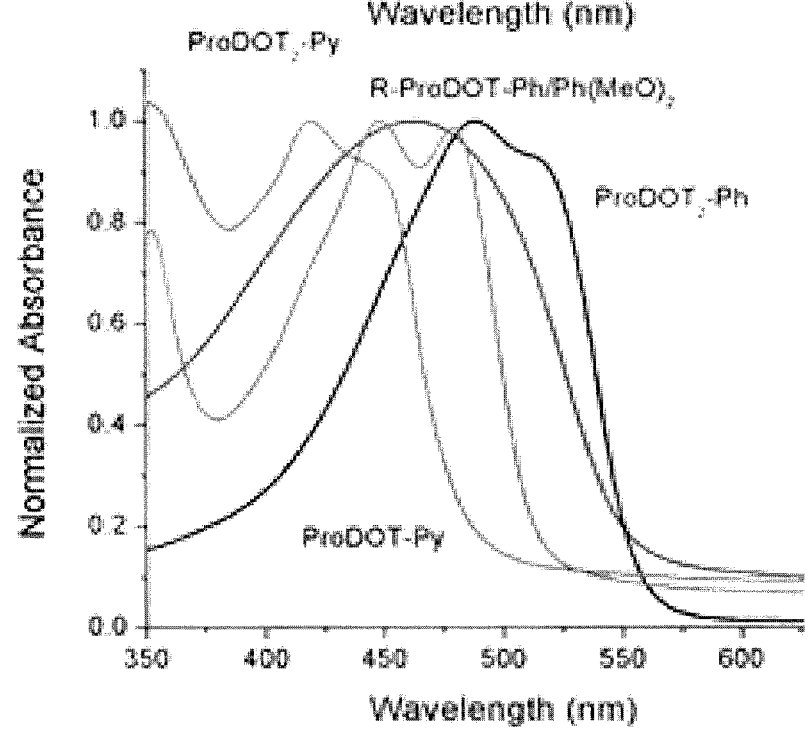
FIG. 4B shows R-ProDOT-Ph/Ph(MeO)$_2$, ProDOT-Py, ProDOT$_2$-Py, and ProDOT$_2$-Ph.

The neutral state spectra of each copolymer cast as a film at 0 V can be seen in FIG. 4, where the films of copolymers exhibit the following band gaps (from highest to lowest): ProDOT-Py (2.59 eV)>ProDOT-Fl (2.51 eV)>ProDOT-Cbz (2.48 eV)>ProDOT-Ph=ProDOT$_2$-Py (2.42 eV)>R-ProDOT-Ph/Ph(MeO)$_2$ (2.26 eV)>ProDOT-Ph(MeO)$_2$ (2.25 eV)>ProDOT$_2$-Ph (2.23 eV). This trend is comparable between the solid state and solution except, as is expected, there is a red shift in the film absorption profiles. The notable exceptions are copolymers that contain dimethoxyphenylene, which exhibit considerable red shifted spectra in the solid state relative to their solution forms. Random copolymer R-ProDOT-Ph/Ph(MeO)$_2$ has the third lowest E$_g$, indicating that there is an increase in conjugation along the backbone, facilitated by the methoxy groups on the phenylene cores inducing S—O interactions with their ProDOT neighbors. The second lowest E$_g$ is for ProDOT-Ph(MeO)$_2$, slightly lower than R-ProDOT-Ph/Ph(MeO)$_2$. Due to dimethoxy substituted phenylene repeating units replacing unsubstituted phenylene repeating units of the R-ProDOT-Ph/Ph(MeO)$_2$, ProDOT-Ph(MeO)$_2$ has a narrow absorption profile, lacking high energy transitions imparted by phenylene neighbors that would induce strain in the backbone. ProDOT$_2$-Ph exhibits an absorption profile of similar shape to that of ProDOT-Ph, but is red shifted by ~40 nm, giving it a vibrant near orange color.

Figure 5:
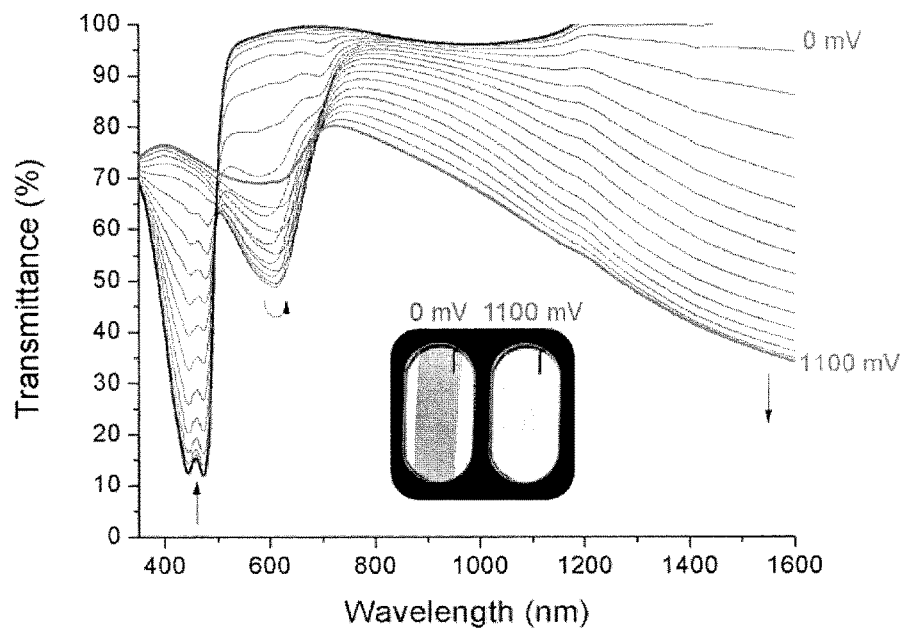
FIG. 5 shows a UV-Vis/NIR transmittance spectroelectrochemistry plot for a ProDOT-Cbz film spray-cast from a 2 mg/mL solution of toluene where electrochemical oxidation was carried out in a 0.2 M LiBTI/PC electrolyte solution with the applied potential being increased in 50 mV steps from 0 mV to 1100 mV.

All copolymer films were oxidized from their neutral forms to the most transmissive, oxidized state in 50 mV steps. ProDOT-Cbz, according to an embodiment of the invention, exhibited the purest yellow neutral state and switches to the most transmissive oxidized state, illustrated by the spectroelectrochemical series shown in the inset to FIG. 5, where the peak at 610 nm is assigned to a polaron and the broad absorption into the NIR is attributed to a bipolaron. Upon oxidation to 1100 mV, ProDOT-Cbz is able to achieve a very transmissive oxidized state and the neutral state color is closer to yellow, as defined by Munsell (L*=81.7, a*=4.0, b*=79.8) than the other copolymers. At about 1180 nm, the transmittance is greater than 100% in the neutral state, due to index matching between the electrolyte, copolymer layer, ITO, and glass to exhibit behavior akin to an anti-reflective coating, allowing greater light to pass through the film and reach the detector relative to baseline.

Figure 6:
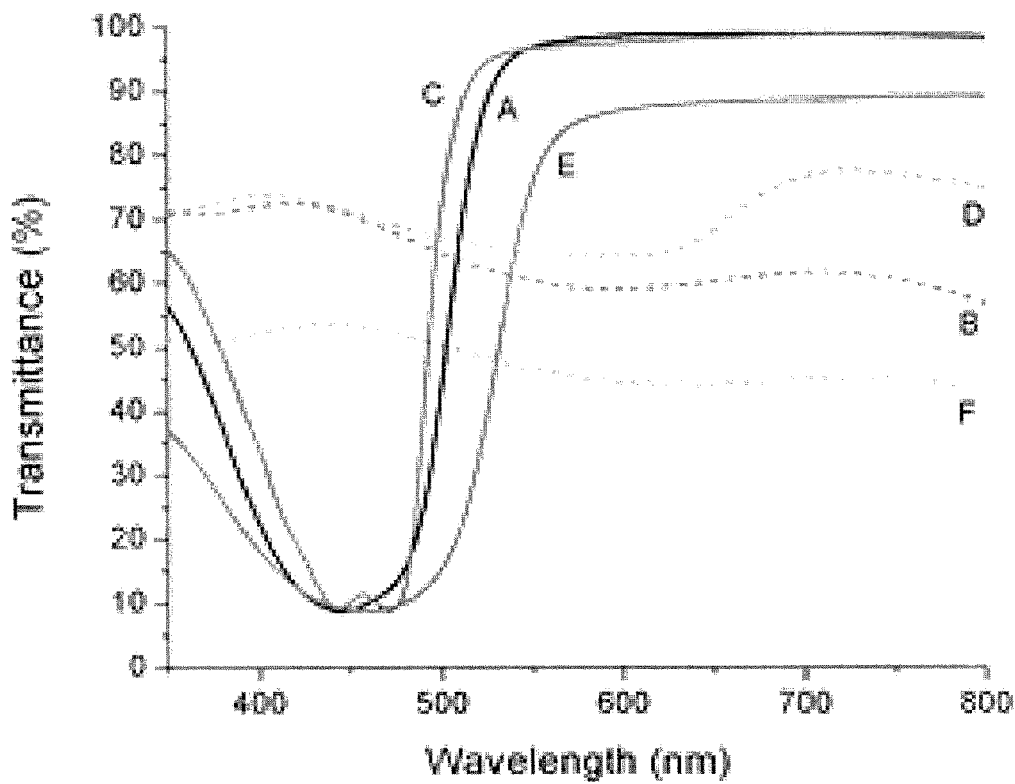
FIG. 6 shows plots of % transmittance for the neutral and oxidized forms of ProDOT-Ph (A, B), ProDOT-Cbz (C, D), and R-ProDOT-Ph/Ph(MeO)$_2$ (E,F) where films were sprayed to an absorbance of ~1.0 a.u. at 0 mV (solid lines) and 1150 mV (B), 1100 mV (D), and 950 mV (F).

Spectra for ProDOT-Cbz, R-ProDOT-Ph/Ph(MeO)$_2$, and ProDOT-Ph in the neutral and most oxidized transmissive states is shown in FIG. 6. These copolymers display a true yellow color as defined by Munsell and have highest transmission in the oxidized state of the copolymers prepared. ProDOT-Cbz displays the most transmissive oxidized state of all of the yellow copolymers examined. This is possibly due to lower absorption of residual long wavelength visible light where the oxidation potential that is 50 mV less than ProDOT-Ph.

Figure 7:
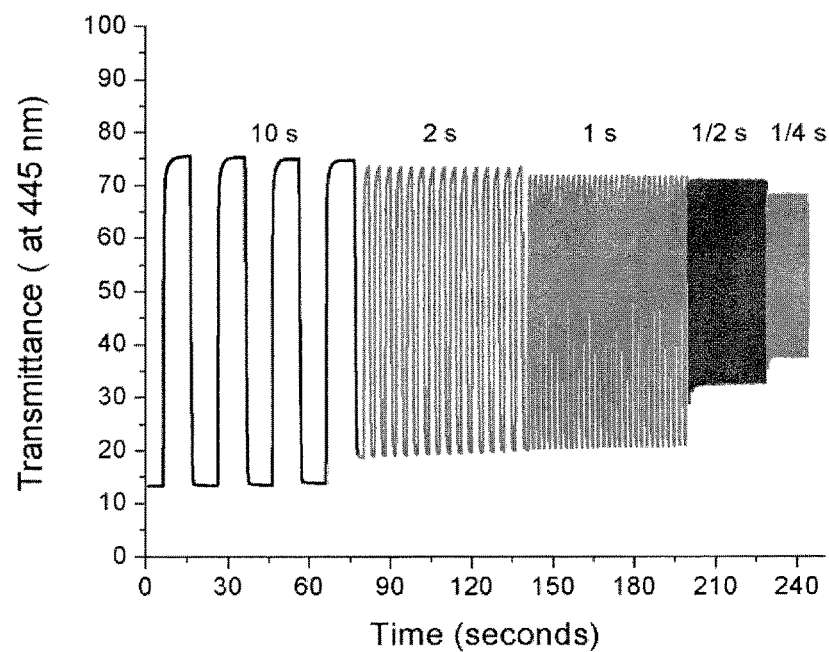
FIG. 7 shows a chronoabsorptometry of ProDOT-Cbz measured at 445 nm from 0 to 1100 mV in an electrolyte solution for switching at 10 to 0.25 seconds.

The bleaching/coloring processes under repeated cycles between the fully colored and bleached states are probed by chronoabsorptometry. The copolymer films, cast onto ITO/glass, are immersed in a fresh electrolyte solution, "broken in" with 4-6 CV cycles, and switched using potential square-waves between the extreme states in intervals of 10 seconds to ¼ second, with the transmission measured at a single wavelength (polymer λ$_{max}$ determined from spectroelectrochemistry). Chronoabsorptometry of ProDOT-Cbz is shown in FIG. 7. At 1 second and longer switching intervals, ProDOT-Cbz possessed a change in transmittance (Δ % T) of 51%, switching from a vibrant yellow neutral state to a highly transmissive oxidized state. At shorter switching intervals, Δ % T for this copolymer decreased significantly to 40% at ½ second and 30% at ¼ second both switching from vibrant yellow states to blue/gray intermediate states.

Figure 8:
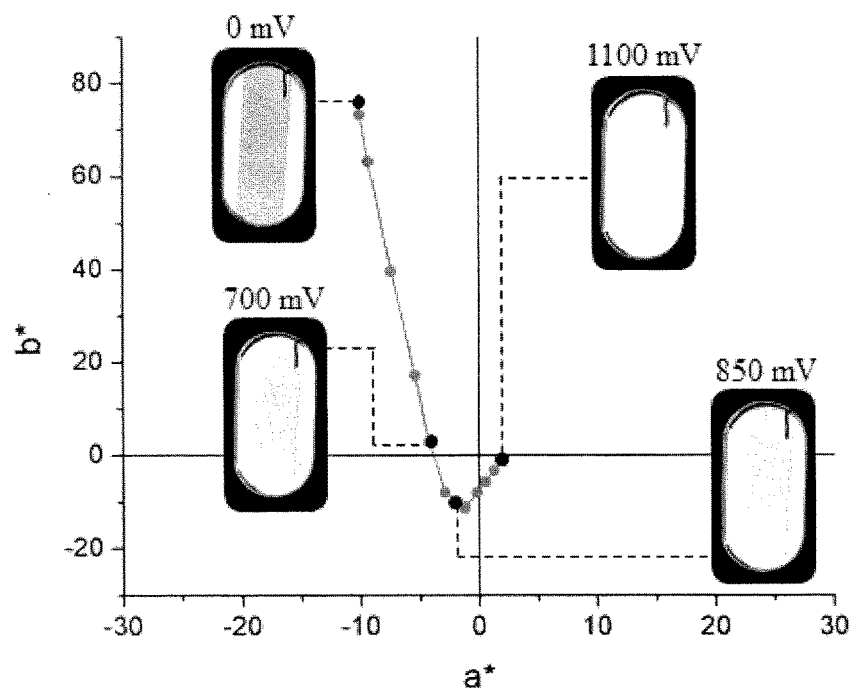
FIG. 8 shows a plot of colorimetry a*b* (CIE 1976 L*a*b* Color Space) color coordinates of a thin film of ProDOT-Cbz having an optical density of 0.8 a. u @ 445 nm as a function of level of electrochemical oxidation (0 to 1100 mV, 50 mV steps).

To elucidate the color properties of each copolymer, colorimetry within the switching window was measured and photographs were obtained for each system. The color of each copolymer film was assessed by utilizing the CIE 1976 L*a*b* Color Space with a D50 illuminant. The colorimetry of ProDOT-Cbz is shown in FIG. 7. Over a range of film thicknesses (measured by optical density), from thin films with low optical density (0.65 absorbance) to thick films with higher optical density (1.42 absorbance), a*b* color values progress further from the origin, increasing color saturation. Values of a* minimally change from −7.7 to −10.6 while b* values progress from 60 to 100, giving more saturated yellow colors with increasing thickness. The copolymer exhibits two transmissive oxidized states. The first at 700 mV, is transmissive and color neutral; however, at this voltage the transmission is 50%, hence, color neutral with low a*b* values. At 850 mV the copolymer exhibits a blue intermediate state due to residual absorption peaking at 610 nm, as in FIG. 5 and FIG. 8. The most transparent state is achieved at a voltage of 1100 mV; a voltage before over-oxidation occurs. The copolymer is capable of solid state emission as supported by fluorescence studies, and photographs of solid films under UV exposure. All of the copolymers possess various neutral state shades of yellow and exhibit transmissive or near transmissive oxidized states.

Figure 9:
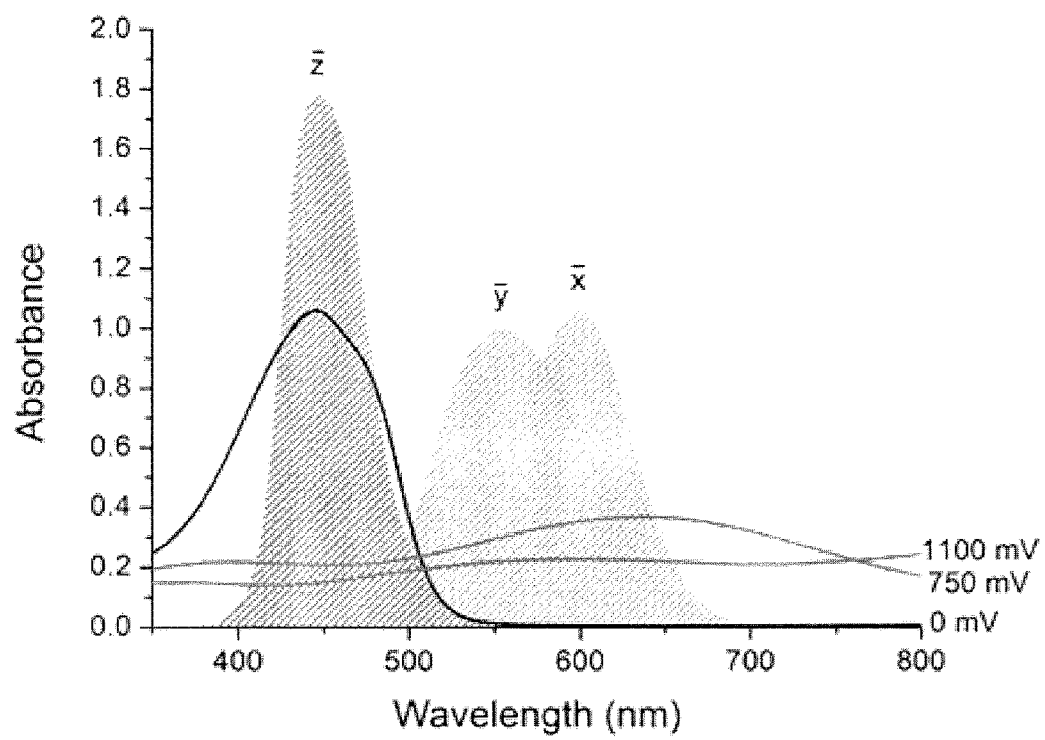
FIG. 9 is a plot of absorption spectra for ProDOT-Ph in the neutral (0 mV), intermediate (750 mV), and fully oxidized (1100 mV) states overlaid on CIE standard observers $\bar{x}$, $\bar{y}$, and $\bar{z}$.

The lightness (L*) of all the copolymers during electrochromic switching begin at relatively high L* values in their neutral forms with values greater than 84. Upon oxidation to the most transmissive forms, the copolymers possess L* values of no less than 84 with the exceptions of R-ProDOT-Ph/Ph(MeO)$_2$, ProDOT-Py, and ProDOT$_2$-Py due to residual absorption of visible light in the most oxidized state. For yellow ECPs undergoing redox processes, the subtle change in L* is related to the sensitivity of the $\bar{y}(\lambda)$ component of the CIE standard observer color matching functions ($\bar{y}$ peaks at 555 nm) and these functions are used when calculating Y according to CIE for the calculation of L*. As illustrated in FIG. 9, the spectral sensitivity curve of this standard observer has little overlap with the neutral state absorption spectra of ProDOT-Ph or any other copolymers examined. Once oxidized to the intermediate state, ProDOT-Ph (and the other yellow ECPs) exhibits a significant dip in lightness as the absorption spectra of these states now overlap with the $\bar{y}(\lambda)$ component.

To gain a greater understanding of the breadth of colors achieved in the neutral state, we present a colorimetric comparison of all copolymers studied. As shown in FIG. 9, all neutral state colors range from vibrant yellows similar to ProDOT-Ph (ProDOT-Cbz possessing nearly the same a*b* values during switching) to colors bordering on or falling into the orange region of the L*a*b* color space such as is the case for ProDOT$_2$-Ph.

Figure 10:
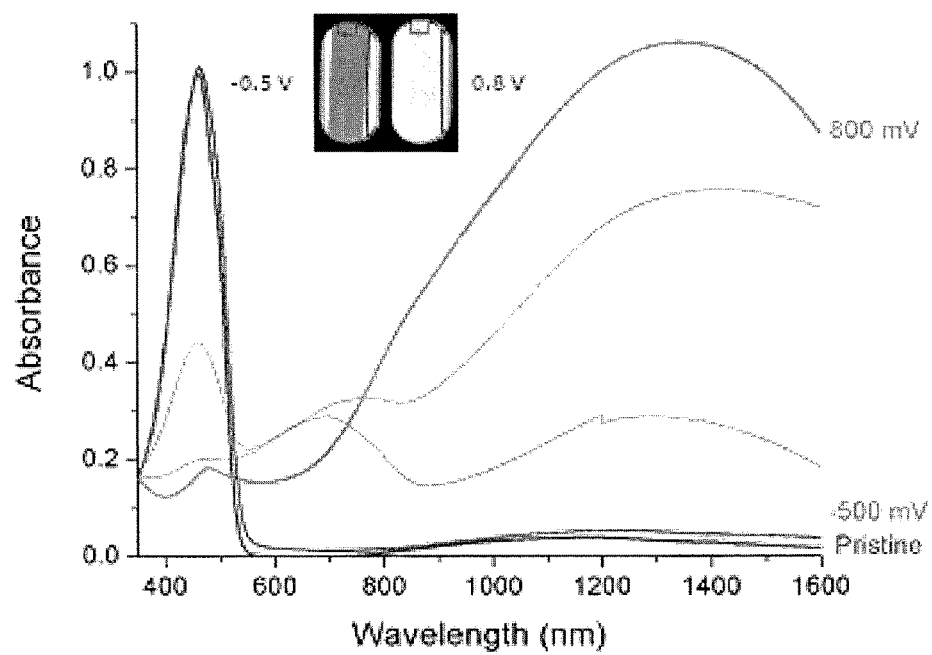
FIG. 10 is a plot of the absorption spectra for a film of AcDOT$_2$-Ph, according to an embodiment of the invention over neutral (−500 mV) to the transmissive oxidized state (800 mV).
Figure 11:
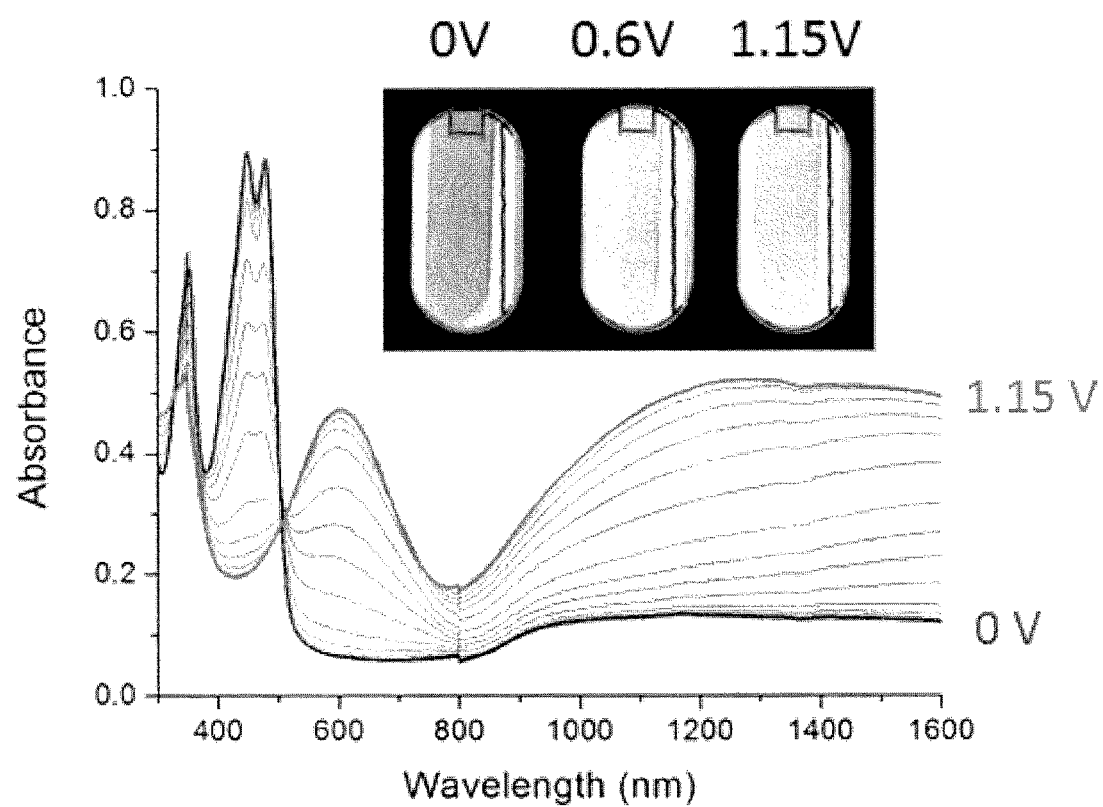
FIG. 11 is a plot of the absorption spectra for a film of ProDOT$_2$-Py, according to an embodiment of the invention over neutral (0 mV) to the transmissive oxidized state (1500 mV).

In an embodiment of the invention, the copolymer has a dyad of ProDOT or AcDOT and an aromatic moiety. FIG. 10 and FIG. 11 show absorbance plots for AcDOT$_2$-Ph and ProDOT$_2$-Py, respectively. In addition to these materials being yellow ECPs in their neutral state with L* values ranging from 40 to 100, a* values ranging from −20 to 40, and b* values ranging from 40 to 100 that can be switched to an oxidized, transmissive state, these copolymers are capable of light emission from the solid state, allowing preparation of solution processable light emitting devices.

METHODS AND MATERIALS

All of the monomers used were synthesized in a straightforward manner and are highly scalable from available starting materials. Boronate monomers can generally be produced in high yield using Miyaura borylation or lithium halogen exchange, often with recrystallization as the only purification step. Iridium catalyzed borylation allowed access to 2,7-bisborylated pyrene efficiently. Suzuki polycondensation was employed to synthesize the copolymers as boronic esters are generally environmentally benign.

The Suzuki condensation reactions afforded copolymers with molecular weights over 10 kDa as measured by GPC vs. polystyrene standards and THF eluent, after initial precipitation into methanol, with the exception of ProDOT-Py and ProDOT$_2$-Py, as these copolymers were not soluble in toluene as the Suzuki reaction progressed. Copolymer purification was conducted via Soxhlet extraction with methanol, acetone, and hexane, followed by dissolution from chloroform. ProDOT-Py and ProDOT$_2$-Py, were removed from the Soxhlet thimble by washing with hot ortho-dichlorobenzene (o-DCB). The final copolymer solutions were concentrated and stirred at 50° C. for 6 hours with 200 mg of diethylammonium diethyldithiocarbamate palladium scavenger dissolved in solution. The solutions were cooled and precipitated in methanol, filtered over a 0.45 micron nylon pad, washed with methanol, collected, and dried under vacuum.

Suzuki couplings allowed synthesis of ProDOT-Ph (MeO)$_2$ and R-ProDOT-Ph/Ph(MeO)$_2$ with M$_n$ over 10 kDa by changing the base from 3 M K$_3$PO$_4$ to 6 M cesium fluoride, though yields were significantly lower than the other copolymerizations.

All copolymers, except ProDOT-Py and ProDOT$_2$-Py due to solubility issues, were dissolved in 0.5 mg/mL in toluene and drop cast onto platinum button electrodes and allowed to dry in air. ProDOT-Py and ProDOT$_2$-Py dissolved in boiling chlorobenzene or hot o-DCB, DPV on button electrodes was not possible as copolymer adhesion issues were encountered. Therefore, films were spincast onto ITO coated glass slides using a hot 20 mg/mL solution in o-DCB at 2200 rpm for 40 seconds to achieve transparent films with only minor defects from aggregation. The films on the electrodes were immersed in a solution of 0.2 M lithium bis(trifluoromethyl)sulfonylimide (LiBTI) in propylene carbonate (PC) with a platinum flag counter electrode and a Ag/Ag$^+$ reference electrode (calibrated to Fc/Fc$^+$).

It should be understood that the examples and embodiments described herein are for illustrative purposes only and that various modifications or changes in light thereof will be suggested to persons skilled in the art and are to be included within the spirit and purview of this application.

We claim:

1. A yellow electrochromic polymer (ECP), comprising a copolymer with a dyad of a dioxy heterocyclic repeating units alternating with an aromatic repeating unit of the structure:

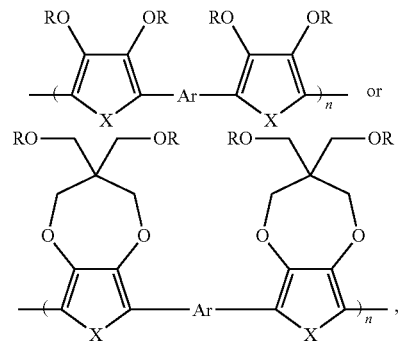

where n is 2 to 200,000; X is S, Se, O, or NR; R is independently H, C$_1$-C$_{30}$ alkyl, C$_2$-C$_{30}$ alkenyl, C$_2$-C$_{30}$ alkynyl, C$_6$-C$_{14}$ aryl, C$_7$-C$_{30}$ arylalkyl, C$_8$-C$_{30}$ arylalkenyl, C$_8$-C$_{30}$ arylalkynyl, C$_2$-C$_{30}$ alkylester, C$_7$-C$_{15}$ arylester, C$_8$-C$_{30}$ alkylarylester, C$_3$-C$_{30}$ alkenylester, C$_3$-C$_{30}$ alkynylester, NH$_2$, C$_1$-C$_{30}$ alkylamino, C$_6$-C$_{14}$ arylamino, C$_7$-C$_{30}$ (arylalkyl)amino, C$_2$-C$_{30}$ alkenyl amino, C$_2$-C$_{30}$ alkynylamino, C$_8$-C$_{30}$ (arylalkenyl) amino, C$_8$-C$_{30}$ (arylalkynyl)amino, C$_2$-C$_{30}$ dialkylamino, C$_{12}$-C$_{28}$ diarylamino, C$_4$-C$_{30}$ dialkenylamino, C$_4$-C$_{30}$ dialkynylamino, C$_7$-C$_{30}$ aryl(alkyl)amino, C$_7$-C$_{30}$ di(arylalkyl)amino, C$_8$-C$_{30}$ alkyl(arylalkyl) amino, C$_{15}$-C$_{30}$ aryl(arylalkyl)amino, C$_8$-C$_{30}$ alkenyl (aryl)amino, $C_8$-$C_{30}$ alkynyl(aryl)amino C(O)NH$_2$ (amido), $C_2$-$C_{30}$ alkylamido, $C_7$-$C_{14}$ arylamido, $C_8$-$C_{30}$ (arylalkyl)amido, $C_2$-$C_{30}$ dialkylamido, $C_{12}$-$C_{28}$ diarylamido, $C_8$-$C_{30}$ aryl(alkyl)amido, $C_{15}$-$C_{30}$ di(arylalkyl)amido, $C_9$-$C_{30}$ alkyl(arylalkyl)amido, $C_{16}$-$C_{30}$ aryl(arylalkyl)amido, thiol, $C_1$-$C_{30}$ alkylhydroxy, $C_6$-$C_{14}$ arylhydroxy, $C_7$-$C_{30}$ arylalkylhydroxy, $C_3$-$C_{30}$ alkenylhydroxy, $C_3$-$C_{30}$ alkynylhydroxy, $C_8$-$C_{30}$ arylalkenylhydroxy, $C_8$-$C_{30}$ aryl alkynylhydroxy, $C_3$-$C_{30}$ polyether, $C_3$-$C_{30}$ polyetherester, $C_3$-$C_{30}$ polyester $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ carboxylate salt, $C_1$-$C_{30}$ thiocarboxylate salt, $C_1$-$C_{30}$ dithiocarboxylate salt, or $C_3$-$C_{30}$ alkyl $C_1$-$C_4$ trialkyammonium salt, and wherein Ar has the structure:

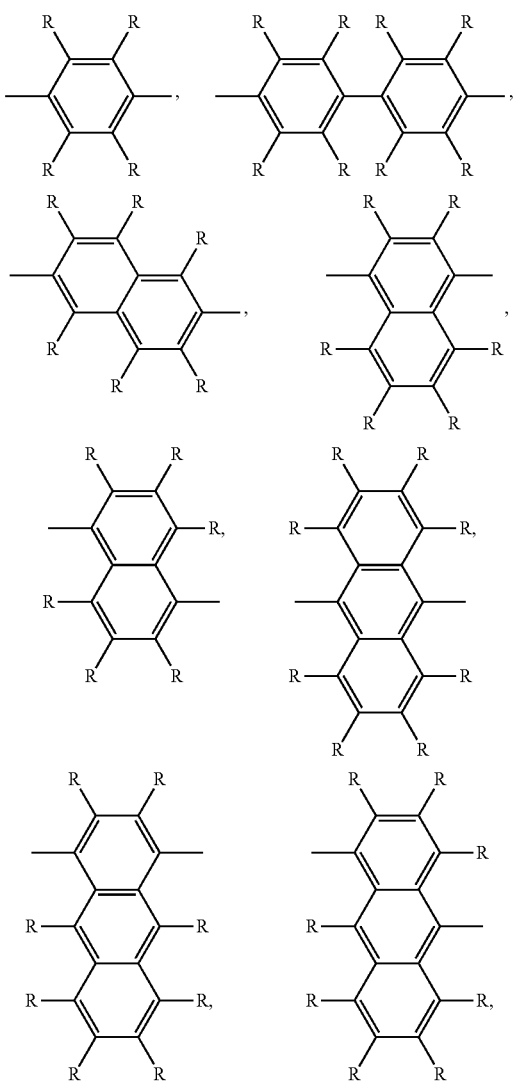

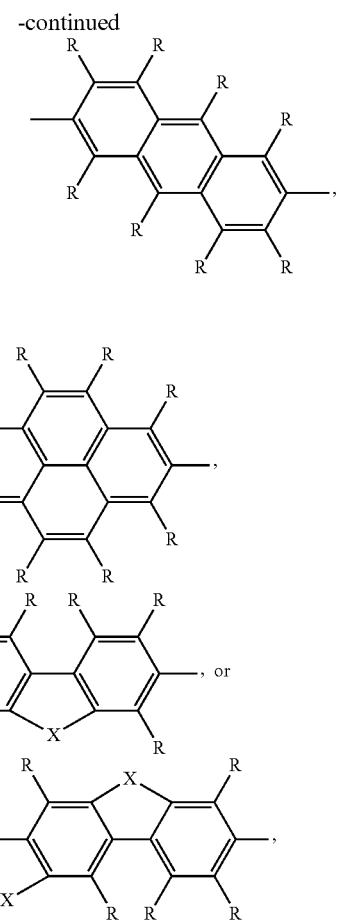

where: X is NR', PR', S, O, Se, SO$_x$, CR$_2$, SiR'$_2$, GeR'$_2$, or BR', where x=1 or 2; X' is NR', O, Se, or S; where R' is H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, $C_1$-$C_{30}$ hydroxyalkyl, $C_6$-$C_{14}$ hydroxyaryl, $C_7$-$C_{30}$ hydroxyarylalkyl, $C_3$-$C_{30}$ hydroxyalkenyl, $C_3$-$C_{30}$ hydroxyalkynyl, $C_8$-$C_{30}$ hydroxyarylalkenyl, $C_8$-$C_{30}$ hydroxyarylalkenyl, $C_3$-$C_{30}$ polyether, $C_3$-$C_{30}$ polyetherester, $C_3$-$C_{30}$ polyester, $C_3$-$C_{30}$ polyamino, $C_3$-$C_{30}$ polyaminoamido, $C_3$-$C_{30}$ polyaminoether, $C_3$-$C_{30}$ polyaminoester, $C_3$-$C_{30}$ polyamidoester, $C_3$-$C_{30}$ alkylsulfonic acid, $C_3$-$C_{30}$ alkylsulfonate salt, $C_1$-$C_{30}$ alkylcarboxylate salt, $C_1$-$C_{30}$ alkylthiocarboxylate salt, $C_1$-$C_{30}$ alkyldithiocarboxylate salt or $C_3$-$C_{30}$ alkyl $C_1$-$C_4$ trialkyammonium salt R" is independently H, $C_1$-$C_{30}$ alkyl, $C_3$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl; and R is independently H, $C_1$-$C_{30}$ alkyl, $C_2$-$C_{30}$ alkenyl, $C_2$-$C_{30}$ alkynyl, $C_6$-$C_{14}$ aryl, $C_7$-$C_{30}$ arylalkyl, $C_8$-$C_{30}$ arylalkenyl, $C_8$-$C_{30}$ arylalkynyl, hydroxy, $C_1$-$C_{30}$ alkoxy, $C_6$-$C_{14}$ aryloxy, $C_7$-$C_{30}$ arylalkyloxy, $C_2$-$C_{30}$ alkenyloxy, $C_2$-$C_{30}$ alkenyloxy, $C_8$-$C_{30}$ arylalkenyloxy, $C_8$-$C_{30}$ arylalkynyloxy, CO$_2$H, $C_2$-$C_{30}$ alkylester, $C_7$-$C_{15}$ arylester, $C_8$-$C_{30}$ alkylarylester, $C_3$-$C_{30}$ alkenylester, $C_3$-$C_{30}$ alkynylester, NH$_2$, $C_1$-$C_{30}$ alkylamino, $C_6$-$C_{14}$ arylamino, $C_7$-$C_{30}$ (arylalkyl)amino, $C_2$-$C_{30}$ alkenylamino, $C_2$-$C_{30}$ alkynylamino, $C_8$-$C_{30}$ (arylalkenyl)amino, $C_8$-$C_{30}$ (arylalkynyl)amino, $C_2$-$C_{30}$ dialkylamino, $C_{12}$-$C_{28}$ diarylamino, $C_4$-$C_{30}$ dialkenylamino, $C_4$-$C_{30}$ dialkynylamino, $C_7$-$C_{30}$ aryl(alkyl)amino, C₇-C₃₀ di(arylalkyl)amino, C₈-C₃₀ alkyl(arylalkyl) amino, C₁₅-C₃₀ aryl(arylalkyl)amino, C₈-C₃₀ alkenyl (aryl)amino, C₈-C₃₀ alkynyl(aryl)amino C(O)NH₂ (amido), C₂-C₃₀ alkylamido, C₇-C₁₄ arylamido, C₈-C₃₀ (arylalkyl)amido, C₂-C₃₀ dialkylamido, C₁₂-C₂₈ diarylamido, C₈-C₃₀ aryl(alkyl)amido, C₁₅-C₃₀ di(arylalkyl)amido, C₉-C₃₀ alkyl(arylalkyl)amido, C₁₆-C₃₀ aryl(arylalkyl)amido, thiol, C₁-C₃₀ hydroxyalkyl, C₆-C₁₄ hydroxyaryl, C₇-C₃₀ hydroxyarylalkyl, C₃-C₃₀ hydroxyalkenyl, C₃-C₃₀ hydroxyalkynyl, C₈-C₃₀ hydroxyarylalkenyl, C₈-C₃₀ hydroxyarylalkynyl, C₃-C₃₀ polyether, C₃-C₃₀ polyetherester, C₃-C₃₀ polyester, C₃-C₃₀ polyamino, C₃-C₃₀ polyaminoamido, C₃-C₃₀ polyaminoether, C₃-C₃₀ polyaminoester, C₃-C₃₀ polyamidoester, C₃-C₃₀ alkylsulfonic acid, C₃-C₃₀alkylsulfonate salt, C₁-C₃₀ carboxylate salt, C₁-C₃₀ thiocarboxylate salt, C₁-C₃₀ dithiocarboxylate salt, or C₃-C₃₀ alkylC₁-C₄ trialkyammonium salt.

2. The yellow electrochromic polymer (ECP) according to claim 1, wherein Ar has the structure:

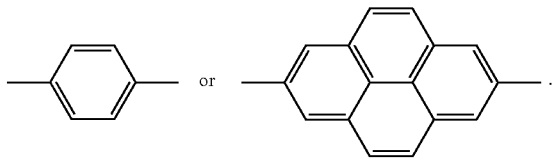

3. The yellow electrochromic polymer (ECP) according to claim 1, wherein the copolymer has the structure:

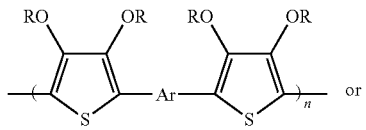 or

-continued

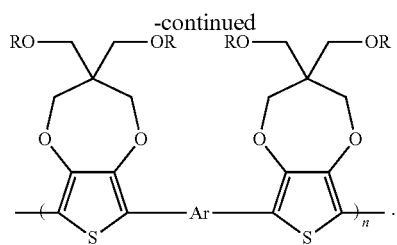

4. The yellow electrochromic polymer (ECP) according to claim 1, wherein the copolymer is soluble in at least one organic solvent.

5. A yellow electrochromic polymer (ECP), comprising an alternating copolymer with a propylene dioxythiophene (ProDOT) or an acyclic dioxythiophene (ACDOT) repeating unit alternating with one or more aromatic repeating units wherein the oxidation potential is 450 mV or less, and wherein at least one of the aromatic repeating units comprises an electron donating substituent.

6. The yellow electrochromic polymer (ECP) according to claim 5, wherein the copolymer has the structure: ProDOT-Cbz; R-ProDOT-Ph/Ph(MeO)₂; or ProDOT-Ph(MeO)₂.

7. A yellow electrochromic polymer (ECP), comprising an alternating copolymer with a propylene dioxythiophene (ProDOT) or an acyclic dioxythiophene (ACDOT) repeating unit alternating with a pyrene repeating unit, wherein the pyrene repeating unit has the following structure:

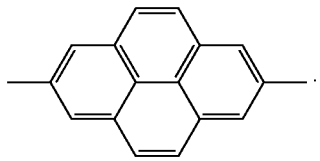

* * * * *